March 19, 1957   H. J. HOMRIG ET AL   2,785,783
CLUTCH LOCKING DEVICE
Filed July 26, 1954   2 Sheets-Sheet 1

INVENTORS
HORACE J. HOMRIG
GEORGE D. SIMONDS
BY Wheeler, Wheeler & Wheeler
ATTORNEYS March 19, 1957

H. J. HOMRIG ET AL 2,785,783

CLUTCH LOCKING DEVICE

Filed July 26, 1954

INVENTORS
HORACE J. HOMRIG
BY GEORGE D. SIMONDS

Wheeler, Wheeler & Wheeler
ATTORNEYS

United States Patent Office 2,785,783
Patented Mar. 19, 1957

2,785,783
CLUTCH LOCKING DEVICE

Horace J. Homrig and George D. Simonds,
Clintonville, Wis.

Application July 26, 1954, Serial No. 445,672

6 Claims. (Cl. 192—114)

This invention relates to a clutch locking device and more particularly to a device for locking and unlocking a jaw type clutch under control of the shift lever by which the clutch is actuated.

The primary object of the invention is to provide means whereby the jaw teeth of a clutch, once engaged, are locked against unintended release, but are subject to release by actuation by the shift lever which controls normal clutch action.

The invention resides in a novel detent which automatically locks the clutch teeth in mesh to preclude disengagement thereof during normal operation of the device but which is retracted upon actuation of the shift lever in the direction to disengage the teeth. In the specific embodiment of the invention herein disclosed, the shift lever is interrelated to the unlocking means through a lost motion connection whereby in the first increment of shift lever movement the detent is removed from positive interlocking engagement with the tooth key, and in a succeeding movement of the shift lever the key is bodily shifted in a manner to cam the detent completely into a retracted position.

Other objects and advantages of the invention will appear upon examination of the following disclosures.

In the drawings:

Fig. 4 is a cross sectional view of the device of Fig. 2 but taken on a plane at right angle to the plane on which Fig. 2 is taken.

Figure 1:
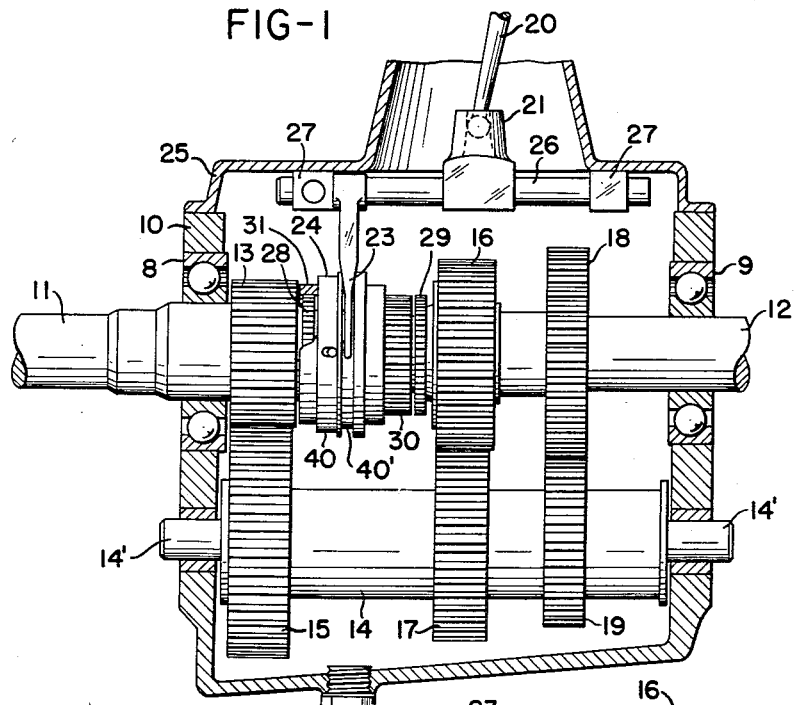
Fig. 1 is a cross sectional view through a transmission case showing a two-speed transmission embodying my invention.

Fig. 1 diagrammatically represents a conventional two-speed gear transmission to which my invention has been applied. It is understood, of course, that the invention is not limited to the specific embodiment illustrated in the drawing. Any transmission including a clutch having a shiftable clutch key or tooth is subject to improvement by the device of my invention.

Figure 4:
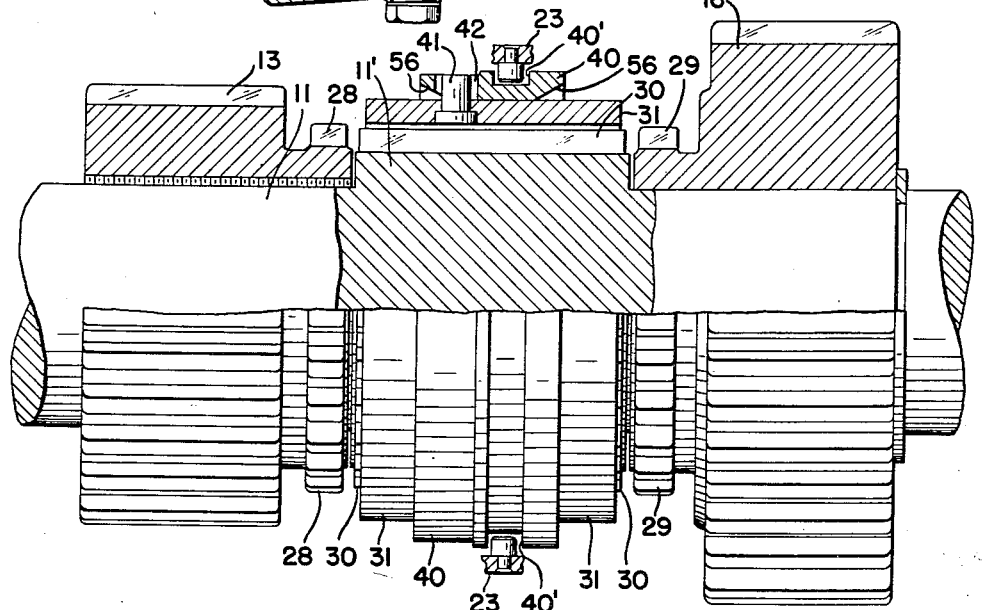
Figure 2:
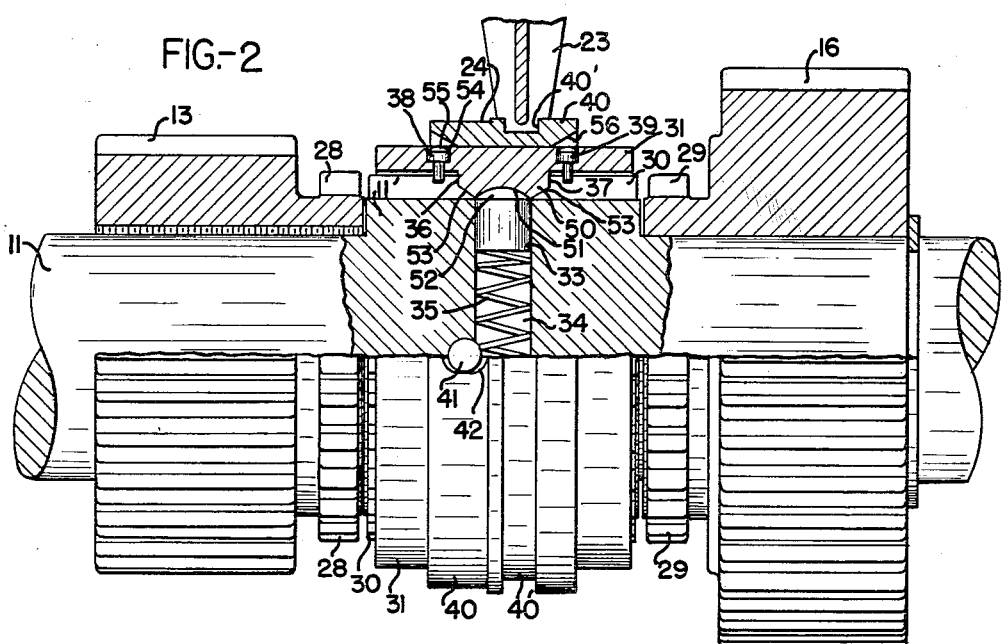
Fig. 2 is an enlarged cross sectional view taken through my clutch showing the parts in a neutral position.
Figure 3:
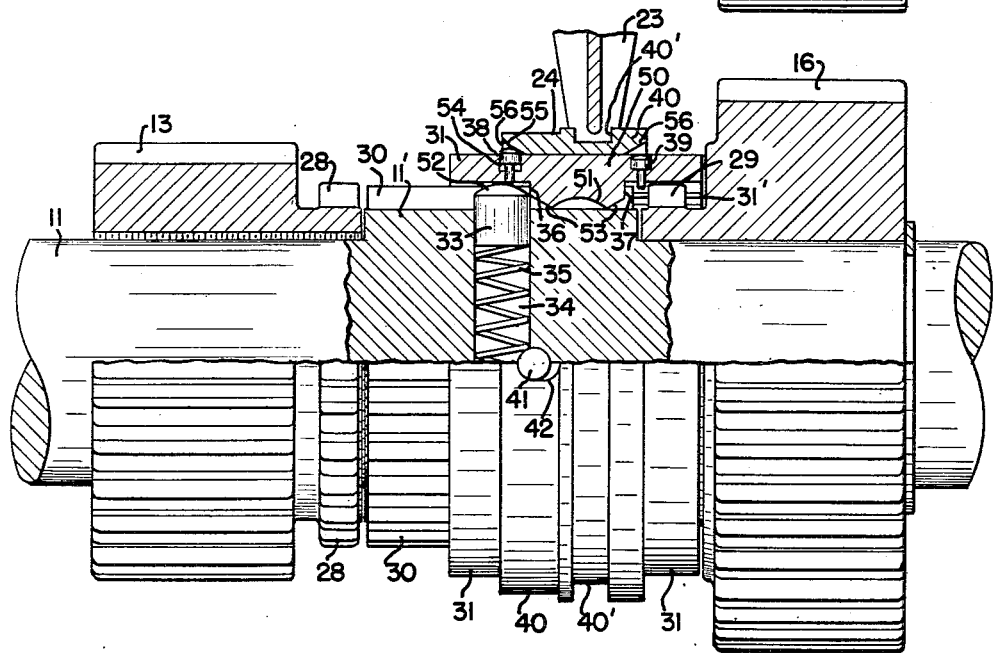
Fig. 3 is a view similar to that shown in Fig. 2 but showing the parts in a clutch coupling position.

The gear case 10 is provided with axially aligned ball bearings 8 and 9 on which the axially aligned driving and driven shafts 11 and 12 are supported for independent rotation. Shaft 11 is provided with axially spaced freely rotatable spur gears 13 and 16 between which I mount my lock jaw clutch 24 on the annular boss 11' formed on shaft 1. As best shown in Figs. 2, 3 and 4, gear 13 is provided with an integral ring gear having spur teeth 28 and gear 16 is provided with a ring gear having spur teeth 29. The respective ring gears 28 and 29 function as part of the clutch 24 and for this purpose are disposed proximate annular boss 11' for selective engagement by the tooth keys 31' formed on clutch sleeve 31, as hereinafter described.

Rotatably mounted in the gear case 10 on its axial bearing pins 14' is a countershaft 14 laterally offset from the coaxial shafts 11 and 12. Countershaft 14 is provided with spur gears 15 and 17 which are radially aligned with and in constant mesh with the gears 13 and 16. Countershaft 14 is also provided with a spur gear 19 which is in constant mesh with the spur gear 18 on the driven shaft 12. As is well known in this art the shaft 12 is driven at a speed which is dictated by whichever of gears 13 and 16 is coupled to shaft 11 through the clutch 24.

As best shown in Figs. 2 and 3, the annular boss 11' on shaft 11 is provided with splines 30 with which splines or tooth keys 31' on the sleeve 31 engage. As best shown in Figs. 1 and 4, sleeve 30 is provided at diametrically opposite points thereon with radial pins 41 which project into the axially elongated slot 42 in a shift sleeve 40. Shift sleeve 40 is also provided with a circumferential groove 40' to receive the arms 23 of a shift fork mounted on shift rod 26. The shift rod 26 has a bearing in the blocks 27 which are mounted on the inside of transmission cover 25. Shift rod 22 is actuated by shift lever 20 interconnected to the shift rod through the shift head 21.

Accordingly, on appropriate movement of the shift lever 20, the fork arms 23 are reciprocated axially to shift sleeve 40. Through the interaction of the sleeve 40 on pin 41 the sleeve 31 is axially shifted to engage its key or teeth 31' selectively with either of ring gears 28, 29, depending upon the direction of shift lever movement. In Fig. 1 the parts are shown in a position in which the key 31' is engaged with the ring gear 28. In Fig. 3 the parts are shown in their position in which the key 31' is engaged with ring gear 29. In Figs. 2 and 4 the parts are shown in an intermediate or neutral position.

Thus far the device as described is conventional. However, since various running stresses set up in the transmission 10 tend to cause retractive movement of the sleeve 31 to disengage its key splines 31' from the ring gear teeth 28, 29, I provide a novel locking device by which the sleeve 31 is held against retractive movement and a novel unlocking device by which the locking device is disengaged incident to movement of the shift lever in its normal direction to withdraw the key splines from engagement with the ring gear teeth.

As best shown in Figs. 2 and 3 one or more of the key splines 31' may be mutilated by cutting away its marginal portions to leave only a central portion or head 50. Head 50 has a concave recess 51 to receive the convex end 52 of a detent pin 33. The pin 33 is mounted in a radial bore 34 formed in the annular boss 11' of shaft 11. The detent pin 33 is biased radially outwardly by means of a coil spring 35 seated in bore 34. At both sides of its concave recess 51 the head 50 is provided with beveled or oblique cam surfaces 53. These cams act on the detent to force it against the bias of spring 35 to a retracted position as hereinafter explained.

When the shift fork 23 is actuated to move the sleeve 31 from its position shown in Fig. 2 to its position shown in Fig. 3, the wall of the concave recess 51 cams detent 33 downwardly into bore 34 against the bias of spring 35. When pressure on the detent is released by passage of the sleeve 31 to its Fig. 3 position, the detent lifts under the bias of its spring 35 until its end 52 engages the under-surface of sleeve 31. In this position the cylindrical wall of the detent engages behind the locking shoulder 36 of head 50. Head 50 is provided with a second locking shoulder 37 behind which the detent will seat when the sleeve 31 is shifted to its opposite extreme position. Because of the positive interlock between the detent 33 and locking shoulder 36, disengagement of key splines 31' from the ring gear teeth 29 is positively precluded.

Sleeve 31, however, is provided with unlocking means comprising motion transmitting plungers or pins 38, 39 which are mounted in suitable countersunk apertures 54 in the sleeve. These plungers have rounded heads 55 engaged by beveled or oblique cam surfaces 56 on the under surface of shift sleeve 40. Accordingly, on movement of the shift fork arms 23 in a direction to declutch ring gear 29, the first increment of movement of the sleeve 40 will cam plunger 38 downwardly against detent 33 with which it aligns in the Fig. 3 position of the parts. The downward movement of plunger 55 in the lost motion interval before pin 41 engages the end of slot 42 is just sufficient to depress detent 33 to a position where the cylindrical surface of detent pin 33 disengages from locking shoulder 36 on head 50 and cam surface 53 on head 50 engages the rounded upper surface 52 of the detent 33. Thereafter continued movement of sleeve 40 will engage pin 41 with the end of slot 42 to shift sleeve 31. Detent 33 will continue to retract into its bore 34 under pressure of cam 53.

If the clutch is to be placed in neutral position shift lever movement is continued until the detent engages the recess 51 of head 50. If the clutch is to be engaged with ring gear 28 on spur gear 13, shift lever movement is continued until the key spline 31' engages the ring gear 28. The parts then assume a position which is the converse of that shown in Fig. 3.

While the number of detents 33 and cut-out key splines is generally immaterial to the invention, I have found it satisfactory to provide two such cut-out key splines, disposed diametrically opposite in the annular boss 11' and 90 degrees removed from the oppositely disposed pins 41.

While the device of my invention is intended to be actuated in the aforedescribed manner in which the splined sleeve 31 is shifted to its extreme position in which the detent engages behind locking shoulders 36, 37, the splined sleeve is impositively locked against disengagement even if it is not moved to extreme position and detent 33 is not fully extended from its bore. So long as the rounded end 52 of the detent engages cams 53 the bias of spring 35 will impositively lock the sleeve against retraction, subject, of course, to positive displacement thereof by manipulation of shift lever 20.

I claim:

1. In a transmission the combination with a driving shaft, a gear rotatable with respect to said shaft and a clutch adjacent said gear, said clutch comprising a key and shiftable means for moving the key to selectively couple said gear to said shaft, of means for locking said key in coupled position, said locking means comprising a detent, means for biasing said detent toward locking engagement with said key when it is in coupled position whereby to preclude release of said coupling, and unlocking means for releasing said detent from locking engagement with said key when the shifting means is actuated to move said key out of coupled position, said unlocking means comprising a motion transmitting plunger and means mounting said plunger in said key for rectilinear movement on its longitudinal axis, said key being aligned with said detent when the key is in its coupled position, said shiftable means comprising a member having a cam engageable with said plunger to retract said detent from locking engagement with the key in the course of movement of said shiftable means in a direction to uncouple said key from said gear.

2. The device of claim 1 in which said key is provided with a depression intermediate its ends to receive the detent and hold the key in a neutral position.

3. The device of claim 1 in which said motion transmitting plunger is provided with an enlarged head, the means mounting said plunger being provided with a shoulder in the path of head movement to limit movement of the plunger.

4. The device of claim 1 in which said detent is provided with a locking shoulder and a cam follower surface, said key being provided with a cam, a locking shoulder engaged with the locking shoulder of the detent in the coupled position of the key, and means connecting said shifting sleeve with said splined sleeve whereby continued movement of the shifting sleeve forces the cam of the splined sleeve against the detent to further retract said detent in its mounting, said member having a lost motion connection with said key whereby said member may be moved to cam said plunger against said detent and release the detent locking shoulder from the key locking shoulder before continued movement of said member moves the key to engage its cam with the cam follower of the detent to retract the detent against its biasing means.

5. The device of claim 4 in which said key comprises a sleeve splined to said shaft, said shiftable member comprising a sleeve mounted on said splined sleeve, one of said sleeves having a slot elongated in the direction of its shifting movement and the other of said sleeves having a pin engaged in said slot and comprising with said slot said lost motion connection.

6. In a device of the character described the combination of a driving shaft having a splined portion, an internally splined sleeve slidable on said splined portion and having a locking shoulder and a cam adjacent said shoulder, a spring loaded detent pin mounted in said shaft splined portion and movable under the bias of its spring to a locking position behind said locking shoulder, an unlocking pin mounted for movement in said splined sleeve and aligned with said detent in one position of the splined sleeve and a shifting sleeve slidable on and concentric with said splined sleeve, said shifting sleeve having a cam engageable with said unlocking pin to actuate said unlocking pin to retract said detent pin from engagement with said locking shoulder, and means connecting said shifting sleeve with said splined sleeve whereby continued movement of the shifting sleeve forces the cam of the splined sleeve against the detent to further retract said detent in its mounting.

References Cited in the file of this patent
UNITED STATES PATENTS 1,936,713     Freeman et al.            Nov. 28, 1933
2,460,295     Keese                  Feb. 1, 1949